Dec. 17, 1963  W. H. DU BOIS ETAL  3,114,197
BRAKE ELEMENT HAVING METAL FIBER REINFORCING
Filed June 17, 1960  3 Sheets-Sheet 1
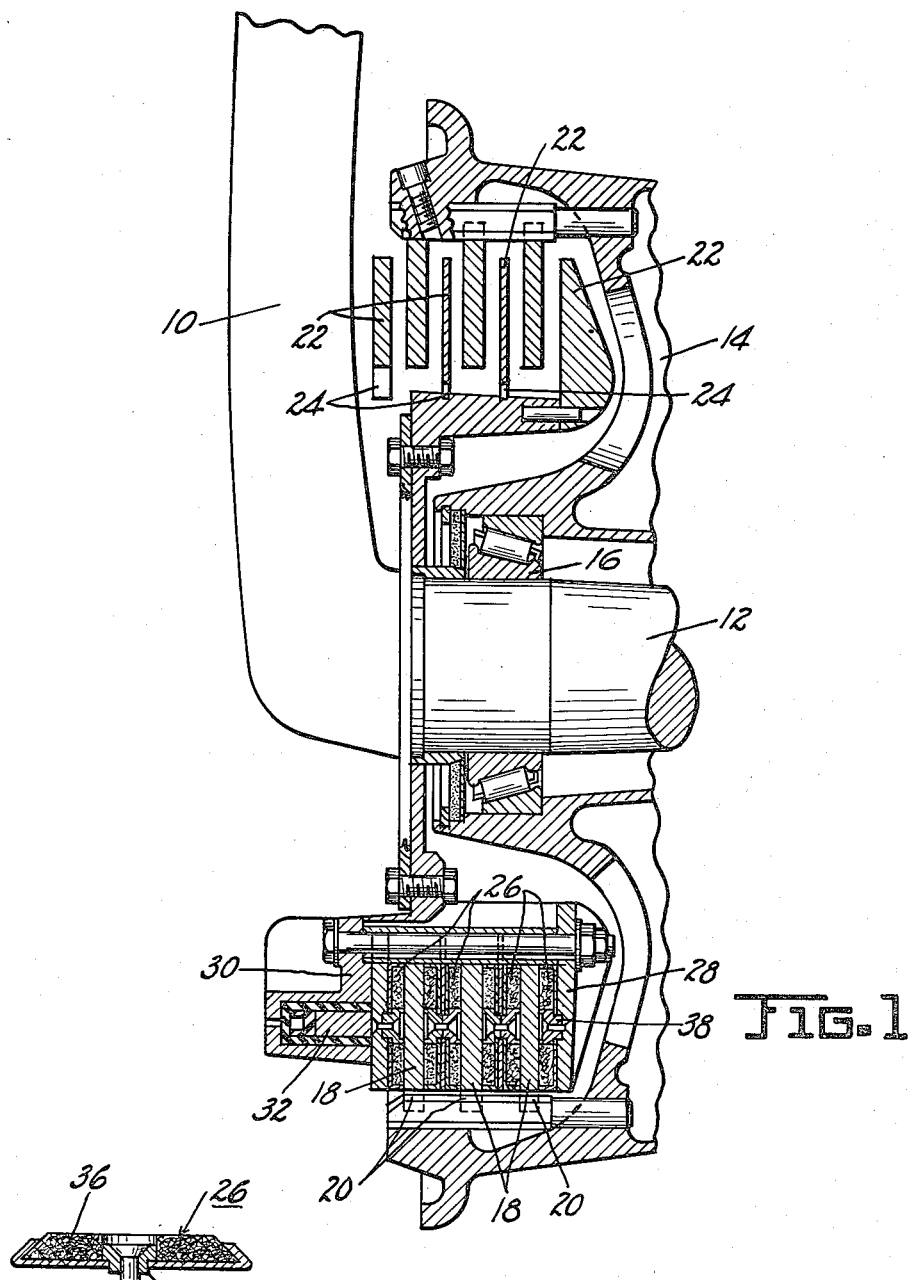
INVENTORS:
WILLIAM H. DUBOIS
DOUGLAS J. ROTH
BY
William P. Hickey
ATTORNEY Dec. 17, 1963    W. H. DU BOIS ETAL    3,114,197
BRAKE ELEMENT HAVING METAL FIBER REINFORCING
Filed June 17, 1960    3 Sheets-Sheet 3

INVENTORS
WILLIAM H. DUBOIS
DOUGLAS J. ROTH
BY

United States Patent Office 3,114,197
Patented Dec. 17, 1963

3,114,197
BRAKE ELEMENT HAVING METAL FIBER REINFORCING
William H. Du Bois and Douglas J. Roth, South Bend, Ind., assignors to The Bendix Corporation, South Bend, Ind., a corporation of Delaware
Filed June 17, 1960, Ser. No. 36,779
6 Claims. (Cl. 29—182.2)

The present invention relates to means for strengthening sintered powdered materials generally; and more particularly to means for increasing the strength of sintered powdered metal matrix friction materials.

The primary object of the present invention is the provision of means and/or method for strengthening cermet friction materials so that they will be capable of withstanding the severe service encountered in braking heavy jet aircraft.

A more general object is the provision of means and/or method for strengthening all types of sintered powdered materials be they metals, ceramics, or mixtures of the two.

The invention resides in certain constructions, and combinations, and arrangements of materials, and further objects and advantages of the present invention will become apparent to those skilled in the art to which the invention relates from the following description of the several preferred embodiments described with reference to the accompanying drawings forming a part of this specification, and in which:

FIGURE 1 is a cross sectional view of an aircraft brake in which principles of the present invention are embodied;

FIGURE 2 is a fragmentary cross sectional view of one of the frictional producing elements shown in FIGURE 1;

Figure 3:
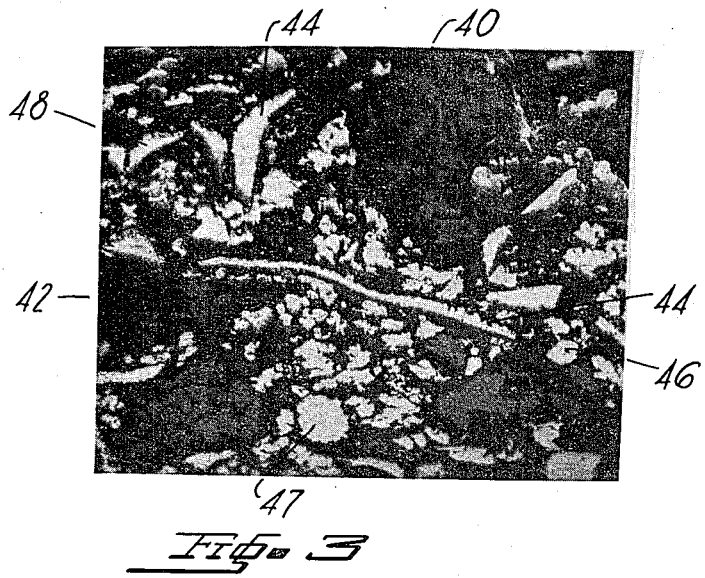
FIGURE 3 is a photomicrograph of an improved friction material shown in FIGURES 1 and 2, and which embodies principles of the present invention and which is shown approximately 153 times its normal size.

Referring to FIGURE 1 of the drawings, there is shown therein a typical aircraft brake and strut assembly as is used on modern jet aircraft. The structure shown generally comprises a strut 10 having a horizontal axle 12 thereon, and to which the aircraft wheel 14 is suitably journalled by means of roller bearings 16 (only one of which is shown). The braking structure portion generally comprises a plurality of annular disc-shaped rotor members 18 (there being three shown in the drawing) which are keyed to the wheel as at 20; and a plurality of annular stator members (four of which are shown in the drawing) which are keyed to the stationary structure of the strut as at 24. Each of the stator members 22 are provided with a plurality of friction elements 26 which engage opposite sides of the rotor members 20; and the rotors and stators are adapted to be compressed together between the outer abutment structures 28 and 30 of the brake by means of a plurality of hydraulically actuated pistons 32 (only one of which is shown). For a more complete understanding of the structure so far described, reference may be had to the W. H. DuBois Patent 2,731,312.

The friction elements 26 used in the brake structure above described are formed generally by means of a shallow cup-shaped metallic structure usually formed of a mild steel into which a suitable cermet material 36 is packed and then sintered. Each friction element 26 is held to its stator member by means of a rivet structure 28. The cermet material 36 generally comprises a suitable ceramic friction producing material such as kyanite held in a metallic matrix for rubbing contact with the opposing surface. The friction elements are made by mixing powders of the two substances together and then pressing and sintering the same to form a sintered powdered cermet structure which provides the high coefficient of friction, and strength required in aircraft brakes. For a more complete understanding of the general type of cermet materials which have been used heretofore, reference may be had to the Stedman et al. Patent 2,784,105.

The cermet materials presently used by the prior art are of course stronger and more durable than the previously used organic friction materials; but even these prior art cermet materials are not capable of withstanding more than approximately 100 stops on a dynamometer simulating the amount of energy absorbed in the average serve landing of a modern jet aircraft of which the DC–8 is a typical example. These dynamometer stops will hereinafter be called simulated service energy stops. Applicants have discovered that when a particular type of fiber is added to these prior art cermet materials a structure can be made which is capable of withstanding 400 simulated service energy stops. Applicants have found that fibers that are made by shearing processes produce greatly improved results over fibers that have smooth edges, as for example wires of approximately the same size.

In order to facilitate the testing of various types of fibers, a sintered cermet matrix material known to have a simulated service life of only 20 to 30 stops was used as a standard to reduce dynamometer test time. This material generally comprises the following percentages by weight:

| | Percent |
|---|---|
| Copper, minus 325 mesh | 60 |
| Molybdenum, minus 325 mesh | 5 |
| Iron, minus 80 mesh | 5 |
| Monel, minus 100 mesh | 1 |
| Mullite, minus 40 plus 100 mesh | 16 |
| Graphite, minus 325 mesh | 13 |

The best prior material heretofore available and which was capable of producing 100 simulated service energy stops generally comprises the following percentages by weight:

| | Percent |
|---|---|
| Copper, minus 325 mesh | 60 |
| Mullite, minus 20 plus 100 mesh | 20 |
| Molybdenum, minus 325 mesh | 5 |
| Graphite, minus 325 mesh | 10 |
| Silica, minus 325 mesh | 5 |

The nonmetallic constituents of this material constitutes approximately 65% by volume of the article.

It will be seen that the primary difference in these materials is in the type and amount of ceramic and graphite materials which are used, and therefore differs by reason of its wear resistance and not in the inherent strength of its matrix material. For this reason, the first mentioned material was used as a standard to which various types and amounts of fibers are added in the following examples:

Example I

A thorough blend of the following percentages by weight of materials was made:

| | Percent |
|---|---|
| Copper, minus 325 mesh | 50 |
| Molybdenum, minus 325 mesh | 5 |
| Iron, minus 80 mesh | 5 |
| Monel, minus 100 mesh | 1 |
| Mullite, minus 40 plus 100 mesh | 16 |
| Graphite, minus 325 mesh | 13 |
| Fibers (approximately ½ inch long) | 10 |

In this mixture the fibers represent approximately 6.7% by volume.

The fibers had a cross section of .001 x .003 inch, and were made by shearing sections approximately .001 wide from stainless steel foil .003 inch thick. This mixture of materials was compacted into a carbon steel cup at approximately 40,000 lbs. per square inch, and was thereafter sintered in a reducing atmosphere for ½ hour at a temperature of 1800° F. The compact was then allowed to cool in a reducing atmosphere to 300° F. and was then coined at approximately 100,000 lbs. per square inch. Twelve of these friction elements or compacts were riveted to a stator and tested against an AMS 6302 steel rotor in a dynamometer under conditions simulating the normal energy stop of a DC-8; and it was found that 115 simulated service energy stops could be made before the remaining cermet materials began to crumble and break out of the cup structure. At this time approximately 50 percent of the cermet material had been worn away.

Figure 5:
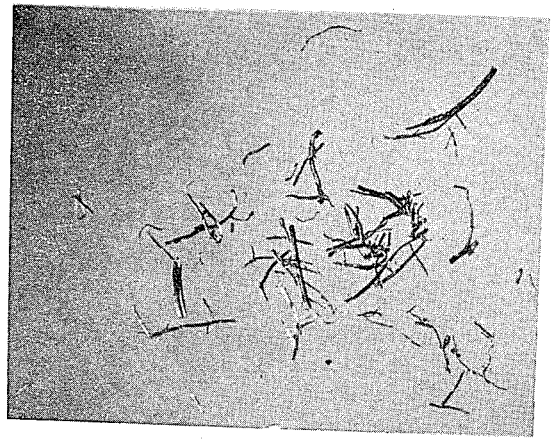
FIGURE 5 is a photograph of the sheared fibers shown in FIGURE 3 shown at approximately 10 times their normal size.

FIGURE 3 of the drawings is a photomicrograph of the type of sintered material used in the present example. In FIGURE 3 the smooth dark areas indicated by the numeral 40 is the kyanite friction producing material, the dark gray areas as indicated by 42 are graphite, the light generally rectangular areas as indicated at 44 are the sheared fibers, the shiny globular areas as indicated by numeral 46 are bodies of molybdenum, the globular area indicated by numeral 47 is Monel, and the irregular light gray areas as indicated by numeral 48 is the copper matrix which extends around the graphite and kyanite to bind the material together. The photomicrograph is taken through the longitudinal center of a fiber seen in center of the figure, and the sheared nature of the fiber can clearly be seen by looking at its edges. These sheared edges have a pronounced effect upon increasing the strength of the sintered compact. FIGURE 5 is a photograph of the type of sheared fibers used in the material of Example I taken at a magnification of approximately 10. By way of contrast the following example is given.

Example II

A mixture of powders identical to that given in Example I above was made excepting that the fibers were replaced with 10% of a type 304 stainless steel wire, .002 of an inch in diameter and ⅛ inch long. This material was made and tested in the same manner as that given above, and the sintered material began to crack and crumble out of the steel cups after 20 simulated service energy stops.

Figure 4:
FIGURE 4 is a photomicrograph similar to that shown in FIGURE 3 excepting that the fibers shown therein do not have sheared edges.

FIGURE 4 is a photomicrograph of material prepared in accordance with the present example. The large light gray areas are indicated by numeral 50 and are the stainless steel fibers. The other materials shown are the same materials seen in FIGURE 3 and are identified by like reference numerals excepting that a prime mark is affixed thereto. It will be seen that the center sections of the sintered wires are somewhat thinner than their end portions. This is because all of the wires were not in the same plane so that upon polishing of the samples more of the center sections of the wires were removed than were their end portions. Nevertheless the surfaces of the sintered wires are generally smoother than the sintered sheared fibers of Example I, and the relative strengthening effect of the two materials is considerably different.

In order to demonstrate that it is the sheared nature of the fiber which produces the beneficial effect, the following test was made.

Example III

A block of 1010 steel was inserted in the chuck of a lathe and turnings were made therefrom having a width of approximately .0015 of an inch and thickness of approximately .0015 of an inch. These lathe turnings were chopped to a length of between ¹⁄₁₆ of an inch to ¼ of an inch in a quite random fashion; and a mixture of materials identical with that given in Example I was made excepting that the above described lathe turnings were substituted for the sheared fibers.

The mixture of materials was fabricated and tested in the same manner as that described for Example I, and it was found that 55 simulated service energy stops could be made before the remaining cermet material began to crack and break out of the supporting cups.

In general, it was found that any suitable metal having a softening point which is not reached or exceeded during the sintering operation, and which has adequate strength at the use temperature can be used.

Example IV

A mixture of powders identical to that given in Example I was made excepting that the fibers used in the present example were made of a sheared nickel fiber having a cross section of .001 x .003 of an inch and a particle length of ³⁄₁₆ of an inch. This material went 40 simulated service energy stops before it began to break out of the supporting cups.

The following tests were made to determine what effect, if any, the length of fibers had upon the strength of the sintered material.

Examples V to VIII

Mixtures of materials identical to that given in Example I were made excepting that carbon steel fibers having a cross section of .0015 x .0015 were used and a different length of fiber was used in each of the following examples. These examples were fabricated and tested in the same manner as given for Example I. The length of fiber used in each of the present examples, and the number of stops which each material underwent before noticeable failure, is given in the following table:

| | Length of fiber in inches | Number of Simulated Service Energy Stops Before Noticeable Failure |
|---|---|---|
| Example 5 | ¹⁄₁₆ | 50 |
| Example 6 | ⅛ | 50 |
| Example 7 | ³⁄₁₆ | 60 |
| Example 8 | ½ | 55 |

In general it will be noted that the length of fiber does not appreciably affect the strength of the sintered article so long as the fibers are appreciably longer than the particle size of the metal powders of the matrix, and are not so long as to be incapable of being uniformly distributed throughout the mixture of powders.

The following series of tests was made to determine the effect obtained by changing the percentage of metal fiber in the sintered article.

Examples IX to XIV

The following mixtures of materials in percentages by weight were prepared, and were then sintered and tested in the same manner as that given for the previously described examples. The number of simulated service energy stops which each underwent before failure is listed below for each example.

Examples

|  | No. IX | No. X | No. XI | No. XII | No. XIII | No. XIV |
|---|---|---|---|---|---|---|
| Copper | 58 | 55 | 50 | 45 | 33½ | 10 |
| Molybdenum | 5 | 5 | 5 | 5 | 5 | 5 |
| Iron | 5 | 5 | 5 | 5 | 5 | 5 |
| Monel | 1 | 1 | 1 | 1 | 2½ | 1 |
| Mullite | 16 | 16 | 16 | 16 | 16 | 16 |
| Graphite | 13 | 13 | 13 | 13 | 13 | 13 |
| Fiber (1010 steel .0015" x .0015" by 1/16" to ¼" long) | 2 | 5 | 10 | 15 | 25 | 50 |
| Number of stops completed | 45 | 45 | 45 | 55 | 80 | 70 |

In Example IX above, the 2% by weight of fiber constitutes about 1% by volume of the article. In Example XIV the 50% fiber by weight constitutes approximately 35% by volume of the article, and the 21% by weight of metal powders constitutes approximately 12% by volume of the article. It will therefore be seen that any article regardless of use can be strengthened by as little as approximately 1% by volume of sheared fibers. It will further be seen that friction materials having from approximately 1% to approximately 35% by volume of fiber, from approximately 12% to approximately 99% by volume of metallic powders, and from approximately 0% to approximately 65% by volume of nonmetallic materials can be made to produce satisfactory results.

In general it can be seen that a small percentage by volume of fibers in a sintered mixture greatly increases the strength of the resulting article, and further, that the strength of the sintered articles does not appear to fall off as the percentage of the fiber is increased. It may furthermore be said that while the materials of Examples IX and X underwent 45 stops each, the articles after the tests were made showed somewhat greater deterioration than did the material of Example XI. Materials similar to that of Example IX, containing no fiber, fail generally after 25 stops.

In general the incorporation of sheared metal fibers strengthens any suitable sintered powdered mixtures of metals and/or ceramic materials as indicated in the following examples:

Example XV

A ½ inch thick sintered article 2 inches wide and 3 inches long was prepared using 100% MgO powder of approximately minus 30 mesh size by compacting at 20,000 lbs. per square inch and thereafter sintering at 2200° F. for 1 hour in a hydrogen atmosphere. The article was supported in knife edges placed 2 inches apart in a Universal tester and a load was applied by means of a knife edge centered between the supports in the conventional manner for testing such articles. A load of 266.5 lbs. was applied before the article broke—to give a modulus of rupture equal to 1600 p.s.i. when computed by the following formula:

$$\text{Modulus of rupture} = \frac{3 \text{ load} \times \text{span}}{2 \text{ width} \times (\text{thickness})^2}$$

Example XVI

A sintered article identical to that of Example XV was prepared excepting that it was made of a mixture containing 95% by weight of the MgO of Example XV and 5% of a type 1010 sheared steel fiber .0015 x .0015 x 1/16 to ¼ inch long. This material when sintered and tested in the same manner as that given in Example XV gave a modulus of rupture of 3460 p.s.i. In this example, the fiber occupied 2.4% by volume of the finished article.

Example XVII

A sintered article prepared and tested in the same manner as that described for Example XVI excepting that it contained 50% of the MgO powder there described and 50% of the 1010 steel sheared fibers gave a modulus of rupture of 5500 p.s.i. In this example, the fiber occupied 31% by volume of the finished article.

Example XVIII

A sintered article prepared and tested in the same manner as that described for Example XV excepting that it contained 90% of the MgO powder there described, and 10% of a type 430 stainless steel fiber .001" x .003" x ¼" long gave a modulus of rupture of 2285 p.s.i. In this example the fiber occupied 5% by volume of the finished article.

Example XIX

A sintered article prepared and tested in the same manner as that described in Example XV, excepting that 10% of a .001" x .003" x ¼" long molybdenum fiber was used, and gave a modulus of rupture of 3260 p.s.i. In this example the volume occupied by the fiber was approximately 3.7%.

Materials of this type have been subjected to a flame produced by burning acetylene with oxygen to produce a flame temperature of 5685° F. This material showed better thermal shock and erosion resistance than any previously known materials including other metals, cermets, and other metallically reinforced ceramic structures.

In general any heat resistant ceramic can be used, particular advantages being obtained by the ceramic oxides such as thorium oxide, beryllium oxide and magnesium oxide because of their oxidation resistance. Similarly any sheared metallic fiber can be used, particular advantages being obtained however with molybdenum sheared fiber because of its high melting point.

Example XX

A sintered compact of the same general size as that described in Example XV was made from a material having the following percentages by weight:

| | Percent |
|---|---|
| Iron, minus 80 mesh | 60.0 |
| Molybdenum, minus 325 mesh | 5.0 |
| Mullite, minus 40 plus 100 mesh | 17.5 |
| Graphite, minus 325 mesh | 17.5 |

The mixture of materials was compacted at 100,000 lbs. per square inch, sintered at 1800° F. for ½ hour in a hydrogen atmosphere, and then coined at 100,000 lbs. per square inch. This sintered article gave a modulus of rupture of 661 p.s.i. when tested in the same manner as was the material described in Example XV.

Example XXI

A sintered compact was made of a mixture having the following percentages by weight:

| | Percent |
|---|---|
| Iron, minus 80 mesh | 50.0 |
| Molybdenum, minus 325 mesh | 5.0 |
| Mullite, minus 40 plus 100 mesh | 17.5 |
| Graphite, minus 325 mesh | 17.5 |
| Fiber | 10.0 |

The fibers used were made of 1010 steel, and a cross section of .0015 x .0015 and a length varying from 1/16 to ¼ of an inch.

The mixture was prepared, sintered and tested in the same manner as was Example XX, and the finished article gave a modulus of rupture of 1035 p.s.i. when tested. The fibers of the finished articles occupied approximately 6% by volume of the finished article, and it will be seen that an increase in strength of approximately 64% was obtained by use of the fiber.

The following described materials are other examples of suitable friction compositions using fibers which have shown superior results. These materials were prepared generally in the same manner as given above in Example I excepting that material A was sintered at 1400° F.

The following materials are given in percent by volume of the finished article:

|  | A | B | C |
|---|---|---|---|
| Copper | 29.4 | 28.0 | 29.2 |
| Sheared .0015 x .0015 steel fiber 1/16" to 1/4" long | 6.7 | 6.4 | 6.7 |
| Molybdenum | 2.6 | 2.5 | 2.6 |
| Tin | 4.3 | 0.0 | 0.0 |
| Mullite | 26.1 | 31.0 | 26.2 |
| Graphite | 30.9 | 22.6 | 31.1 |
| Silica | 0.0 | 9.5 | 0.0 |
| Antimony | 0.0 | 0.0 | 1.2 |
| Monel | 0.0 | 0.0 | 3.0 |

While the improved results in the above examples is attributed to the use of sheared fibers, it will be understood that the improved results are obtained by reason of the sheared nature of the fiber and is not attributed to fibers produced by any particular process. It will be understood that fibers produced by any suitable process which provides a degree of surface roughness comparable to that of the conventional shearing processes above described, shall fall within the terminology of "sheared surface" and/or "sheared fiber" contemplated by this invention and used in the following claims.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

We claim:

1. A sintered powdered friction material selected from the groups consisting of metals, ceramics, and mixtures of metals and ceramics sintered at a generally predetermined temperature and held together by fibers of a metal whose softening point is above said predetermined temperature, said fibers having sheared surfaces and having a maximum cross sectional dimension less than about .003 inch and a length less than about 1/2 inch, and the individual fibers being dispersed throughout, generally separated by, and embedded in said sintered powdered material.

2. A sintered friction material mixture of metal powder and metal fibers sintered at a generally predetermined temperature, said fibers being of a dissimilar metal whose softening point is above said predetermined temperature, said fibers having sheared surfaces and having a maximum cross sectional dimension less than about .003 inch and a length less than about 1/2 inch, said individual fibers being dispersed throughout, generally separated by, and embedded in said metal powder.

3. A sintered powdered ceramic friction material sintered at a generally predetermind temperature, and held together by fibers of a metal whose softening point is above said predetermined temperature, said fibers having sheared surfaces and having a maximum cross sectional dimension less than about .003 inch and a length less than about 1/2 inch, and said individual fibers being dispersed throughout, generally separated by, and embedded in said ceramic powdered material.

4. A high energy friction producing material for brakes and the like for rubbing contact with an opposing surface, said friction material being formed by a sintered powdered material selected from the groups consisting of metals, ceramics, and mixtures of metals and ceramics sintered at a generally predetermined temperature and having sheared metallic fibers less than about 1/2 inch in length distributed uniformly throughout, said fibers being of a metal whose softening point is above said predetermined temperature and which does not appreciably react with powdered material at said predetermined temperature, and the individual fibers being dispersed throughout, generally separated by, and embedded in said sintered powdered material.

5. In a clutch or brake structure and the like having a metallic surface of revolution, a friction element for rubbing contact with said metallic surface and formed structurally by sintering at a generally predetermined temperature, a mixture of from about 12% to about 99% by volume of a powdered metal, and from about 1% to about 35% by volume of a sheared metal fiber having a length generally smaller than about 1/2 inch, said fiber being of a metal which does not soften or appreciably react with the powdered metal at said predetermined temperature, said individual fibers being dispersed throughout, generally separated by, and embedded in said metal powder.

6. A sintered friction material and the like consisting essentially of the following percentages by volume: of from about 12% to about 99% by volume of at least one metal powder, having from 0% to about 65% by volume of at least one nonmetallic powder uniformly distributed therethrough and reinforced by from about 1% to about 35% by volume of metal fibers having sheared surfaces and having a maximum cross section dimension less than about .003 inch, and the individual fibers being dispersed throughout, generally separated by, and embedded in said sintered powdered material.

References Cited in the file of this patent

UNITED STATES PATENTS 2,948,955    Allen et al.    Aug. 16, 1960

FOREIGN PATENTS 733,061    Great Britain    July 6, 1955

OTHER REFERENCES

Metcalfe et al.: Metal Progress, March 1955, pp. 81–84.